United States Patent [19]
Carl et al.

[11] Patent Number: 4,859,745
[45] Date of Patent: Aug. 22, 1989

[54] STRATIFIED FIBROUS FLUOROPOLYMER COMPOSITIONS AND PROCESS FOR FORMING SUCH FLUOROPOLYMERS

[75] Inventors: William P. Carl, Angleton; Emmett L. Tasset, Lake Jackson; Robert E. Aikman, Jr., West Columbia, all of Tex.

[73] Assignee: The Dow Chemical Company, Midland, Mich.

[21] Appl. No.: 136,690

[22] Filed: Dec. 22, 1987

[51] Int. Cl.$^4$ ............................................. C08F 259/08
[52] U.S. Cl. ...................................... 525/276; 525/902
[58] Field of Search .......................................... 525/276

[56] References Cited

U.S. PATENT DOCUMENTS

| Re. 31,907 | 6/1985 | Poirier | 525/276 |
|---|---|---|---|
| 3,282,875 | 11/1966 | Connolly et al. | 260/29.6 |
| 3,301,893 | 1/1967 | Putnam et al. | 260/513 |
| 3,351,619 | 11/1967 | Warnell | 260/80.76 |
| 3,370,105 | 2/1968 | De Bell et al. | 260/880 |
| 3,407,247 | 10/1968 | Reinhardt | 260/881 |
| 3,429,738 | 2/1969 | Donat | 117/100 |
| 3,450,684 | 6/1969 | Darby | 260/87.5 |
| 3,457,209 | 7/1969 | Mikoflavy | 260/29.6 |
| 3,536,733 | 10/1970 | Carlson | 260/348.5 |
| 3,560,568 | 2/1971 | Resnick | 260/513 |
| 3,565,833 | 2/1971 | Adriaan et al. | 260/2.1 |
| 3,577,266 | 5/1971 | Kirkland | 117/100 |
| 3,654,210 | 4/1972 | Kuhls et al. | 260/29.6 F |
| 3,784,399 | 1/1974 | Grot | 117/62.1 |
| 3,798,287 | 3/1974 | Murayama et al. | 260/878 R |
| 3,876,731 | 4/1975 | Woodhead | 260/880 R |
| 3,909,378 | 9/1975 | Walmsley | 204/98 |
| 3,933,773 | 1/1976 | Foerster | 260/87.5 B |
| 3,950,455 | 4/1976 | Okamoto et al. | 260/880 R |
| 3,969,285 | 7/1976 | Grot | 260/2.2 R |
| 3,992,485 | 11/1976 | Kosugi et al. | 260/881 |
| 4,012,462 | 3/1977 | Chaudhary | 260/880 R |
| 4,025,055 | 5/1977 | Dotson et al. | 204/98 |
| 4,035,254 | 7/1977 | Gritzner | 204/98 |
| 4,035,255 | 7/1977 | Gritzner | 204/98 |
| 4,038,231 | 7/1977 | Downer et al. | 525/276 |
| 4,056,578 | 11/1977 | McClure et al. | 260/683.47 |

(List continued on next page.)

FOREIGN PATENT DOCUMENTS

| 0027009 | 4/1981 | European Pat. Off. |
| 1238458 | 4/1967 | Fed. Rep. of Germany . |
| 1341087 | 11/1962 | France . |
| 1410444 | 8/1964 | France . |
| 1422147 | 11/1965 | France . |
| 118597 | 10/1977 | Japan . |
| 1406673 | 9/1975 | United Kingdom . |
| 1497748 | 1/1978 | United Kingdom . |
| 1497749 | 1/1978 | United Kingdom . |
| 1518387 | 7/1978 | United Kingdom . |
| 1550874 | 8/1979 | United Kingdom . |
| 2029827 | 3/1980 | United Kingdom . |

OTHER PUBLICATIONS

"Polymers and Telomers of Perfluoro-1,4-Pentadiene", J. E. Fearn, D. W. Brown, and L. A. Wall, *Journal of Polymer Science: Part A-1*, vol. 4, 1966, pp. 131-140.

(List continued on next page.)

Primary Examiner—John C. Bleutge
Assistant Examiner—Susan Berman

[57] ABSTRACT

The invention is a process for producing a modified polytetrafluoroethylene which comprises polymerizing tetrafluoroethylene in an aqueous medium containing a dispersing agent with a polymerization initiator source and then, copolymerizing tetrafluoroethylene one or more fluorinated modifiers having an acid functional group or a functional group which is convertible to the acid group as a copolymerizable modifier in the presence of the resulting polytetrafluoroethylene to a polymerization point past the Kraft point to produce highly porous, fibrous, stratified fluoropolymers having cores made of homopolymer of poly-tetrafluoroethylene coated with sheath layers which are made of a copolymer of polytetrafluoroethylene and one or more modifiers.

The invention also includes a highly porous, fibrous, stratified fluoropolymer having a plurality of interconnected, fibrous-like projections wherein the stratified fluoropolymer has a core layer of polytetrafluoroethylene substantially completely covered by a copolymer of polytetrafluoroethylene and a fluorocarbon modifier.

21 Claims, 1 Drawing Sheet

U.S. PATENT DOCUMENTS

| | | | |
|---|---|---|---|
| 4,065,366 | 12/1977 | Oda et al. | 204/98 |
| 4,085,071 | 4/1978 | Resnick et al. | 260/22 R |
| 4,088,712 | 5/1978 | Lederer et al. | 260/878 R |
| 4,126,588 | 11/1978 | Ukihashi et al. | 521/31 |
| 4,129,618 | 12/1978 | Downer et al. | 525/276 |
| 4,134,995 | 1/1979 | Fumoto et al. | 525/276 |
| 4,138,426 | 2/1979 | England | 260/465.6 |
| 4,141,874 | 2/1979 | Oka et al. | 260/29.6 F |
| 4,141,933 | 2/1979 | Bracke | 260/880 R |
| 4,151,053 | 4/1979 | Seko et al. | 204/98 |
| 4,151,128 | 4/1979 | Ackerman et al. | 260/17 A |
| 4,153,804 | 5/1979 | Yamabe et al. | 560/183 |
| 4,154,777 | 5/1979 | Shoji et al. | 260/878 R |
| 4,192,725 | 3/1980 | Dotson et al. | 204/98 |
| 4,197,179 | 4/1980 | Ezzell et al. | 204/255 |
| 4,209,635 | 6/1980 | Munekata et al. | 560/183 |
| 4,282,738 | 8/1981 | Zukowski | 525/247 |
| 4,298,697 | 11/1981 | Baczek et al. | 521/27 |
| 4,326,046 | 4/1982 | Miyaka et al. | 525/276 |
| 4,330,654 | 6/1982 | Ezzell et al. | 526/243 |
| 4,337,137 | 6/1982 | Ezzell | 204/252 |
| 4,337,211 | 6/1982 | Ezzell et al. | 260/456 F |
| 4,358,412 | 11/1982 | Ezzell et al. | 260/968 |
| 4,358,545 | 11/1982 | Ezzell et al. | 521/27 |
| 4,368,277 | 1/1983 | Burinsky et al. | 521/84 |
| 4,391,940 | 7/1983 | Kuhls et al. | 524/458 |
| 4,417,969 | 11/1983 | Ezzell et al. | 206/252 |
| 4,434,116 | 2/1984 | Covitch | 264/49 |
| 4,462,877 | 7/1984 | Ezzell | 204/98 |
| 4,469,846 | 9/1984 | Khan et al. | 525/72 |
| 4,470,889 | 9/1984 | Ezzell et al. | 204/98 |
| 4,478,695 | 10/1984 | Ezzell et al. | 204/98 |
| 4,487,903 | 12/1984 | Tatemoto et al. | 526/247 |
| 4,515,989 | 5/1985 | Ezzell et al. | 568/674 |
| 4,554,112 | 11/1985 | Ezzell et al. | 260/543 F |
| 4,578,512 | 3/1986 | Ezzell et al. | 562/586 |
| 4,687,821 | 8/1987 | Ezzell et al. | 526/247 |

OTHER PUBLICATIONS

"Formation of Adducts Between Fluorinated Ketones and Metal Fluorides", F. W. Evans, M. H. Litt, A-M. Weidler-Kubanee and F. P. Avonda, *The Journal of Organic Chemistry*, vol. 33, No. 5, May 1968, pp. 1837–1839.

"Commercial Operation of the Ion Exchange Membrane Chlor-Alkali Process", presented to the American Chemical Society, New York, Apr. 4–9, 1976 by M. Seko.

"The Asahi Chemical Membrane Chlor-Alkali Process", presented to the Chlorine Institute, Inc., New Orleans, LA, Feb. 9, 1977, by M. Seko.

"Perfluorinated Ion Exchange Membranes", presented to the Electrochemical Society, Houston, TX, May 7–11, 1972, by W. G. F. Grot, G. E. Munn and P. N. Walmsley.

"Nafion ® Membranes Structured for High Efficiency Chlor-Alkali Cells", presented to the Electrochemical Society Fall Meeting, Oct. 1977, Atlanta, Ga. by C. J. Hora and D. E. Maloney.

"New Synthetic Reagents and Reactions", *Aldrichimica Acta*, vol. 12, No. 3, 1979, G. A. Olah, pp. 44–49.

"Nafion ® Membranes—Factors Controlling Performance in the Electrolysis of Salt Solutions", presented to the Electrochemical Society Fall Meeting, Oct. 1977, Atlanta, Ga. by G. E. Munn.

"Ion Exchange Membrane for Chlor-Alkali Process", ACS Meeting, Philadelphia, Apr. 1977, Abstract No. 247, pp. 634–635.

CA 97:183006b, vol. 97, 1982, "Porous Supported Catalysts of Polymeric Perfluorosulfonic Acids", S. L. Peluso.

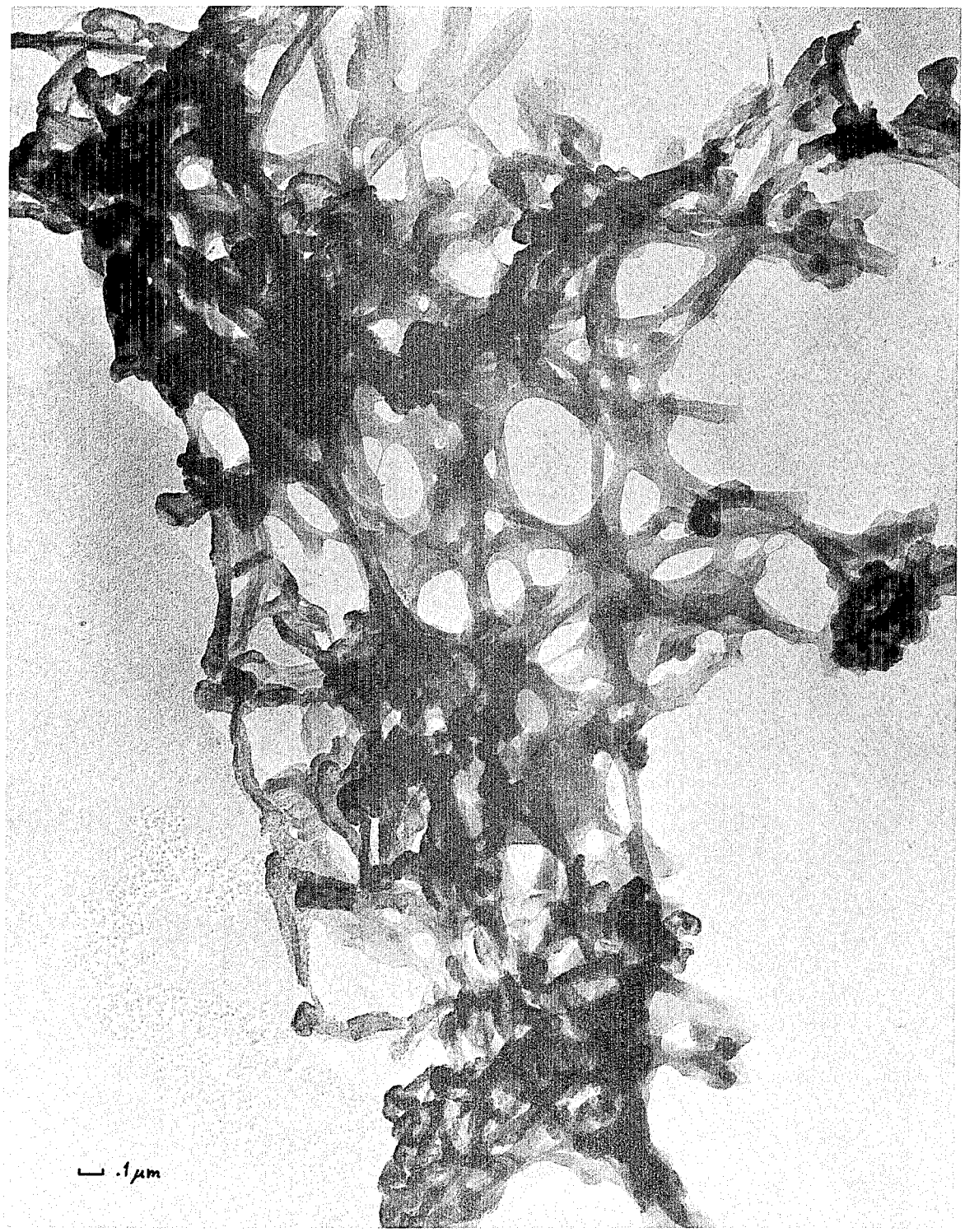

STRATIFIED FIBROUS FLUOROPOLYMER COMPOSITIONS AND PROCESS FOR FORMING SUCH FLUOROPOLYMERS

BACKGROUND OF THE INVENTION

The present invention relates to a process for producing a fibrous, modified polytetrafluoroethylene. More particularly, it relates to a process for producing a fibrous, modified polytetrafluoroethylene having a homopolymer of tetrafluoroethylene as a core and a copolymer having functional groups as a sheath layer the particles are prepared by homopolymerizing tetrafluoroethylene in the first step and then, copolymerizing tetrafluoroethylene and a fluorinated modifier having a specific functional group in the later step, preferably using emulsion polymerization. The polymerization step is taken past the Kraft point to assure that the particles are coagulated and coalesced to form a highly porous, fibrous, stratified fluoropolymer with a plurality of interconnected, three-dimensional fibrous-like projections.

In general, processes are known for using emulsion polymerization to form stratified polymeric particles. For example U.S. Pat. No. 4,326,046 teaches such a method. However, the particles produced according to the method of the '046 patent are inferior in their acid catalyst properties of the materials produced according to the present invention.

SUMMARY OF THE INVENTION

The invention is a process for producing a modified polytetrafluoroethylene which comprises polymerizing tetrafluoroethylene in an aqueous medium containing a dispersing agent with a polymerization initiator source and then, copolymerizing tetrafluoroethylene and one or more fluorinated modifiers having an acid functional group or a functional group which is convertible to the acid group as a copolymerizable modifier in the presence of the resulting polytetrafluoroethylene to a polymerization point past the Kraft point to produce highly porous, fibrous, stratified fluoropolymers having cores made of homopolymer of polytetrafluoroethylene coated with sheath layers which are made of a copolymer of polytetrafluoroethylene and one or more modifiers.

The invention also includes a highly porous, fibrous, stratified fluoropolymer having a plurality of interconnected, fibrous-like projections wherein the stratified fluoropolymer has a core layer of polytetrafluoroethylene substantially completely covered by a copolymer of polytetrafluoroethylene and a fluorocarbon modifier.

DESCRIPTION OF THE FIGURE

The Figure shows a stratified polymer prepared according the the procedures outlined in Example 2 magnified 50,000 times.

DETAILED DESCRIPTION OF THE INVENTION

The invention is a unique process for forming novel fluoropolymer fibrous structures such that the concentration and location of active functional groups is optimized on the outer surface of the structure. The cost of fluoropolymer materials is proportional to the amount of the expensive functional modifiers in them. It is believed that many of the functional groups are not active, as for example in catalysts, because they are occluded in the interior of the fluoropolymer matrix. To bring the cost of these catalyst materials down, inner cores of polytetrafluoroethylene may be formed in the reactor during a first stage of the polymerization and then, copolymerized with polytetrafluoroethylene in the reactor at a subsequent time, a modifier is added to form an outer, intimately attached surface layer of sheath fluoropolymer in a final stage of the polymerization. The resulting particles have inert cores and active surface layers when converted to the useful catalyst form. During preparation, the particles are polymerized past their Kraft point to assure coalescence and coagulation of the particles into a fibrous mass. The fibrous product has the following advantages over other catalyst structures:

1. The present product can be directly fabricated from the fibrous floc that comes out of a reactor.
2. Its fibrous structure provides enough surface area so that it is just as effective per acid equivalent as catalyst produced by fluoropolymer coating methods on an inert support. This gives it the advantage of having more equivalents per volume and more activity per volume.
3. In combining this fibrous structure with a stratified composition, a catalyst can be produced which is highly stable to solvents and will not leach, gel, swell, mechanically break up, peel or otherwise be removed
4. It does not need an inert support which the active fluorocarbon can be coated on, thereby reducing production costs. Also since a support is not needed, any effects that a support might have upon a reaction would be eliminated.

The process of the present invention produces a highly porous, fibrous sheath fluoropolymer with a plurality of interconnected, three-dimensional, fibrous-like projections as shown in FIG. 1. As can be seen the material is a sponge-like, fibrous, porous mass. This high porosity allows the active covering of the material to be used to its maximum efficiency. It has a substantially higher surface area than would a spherical particle, like those produced by the prior art. As can be seen from the scale on the Figure, most of the fibers have a diameter of from about 0.05 to about 0.2 microns.

The process of the present invention is an emulsion polymerization carried out in the presence of a dispersing agent to obtain the fluoropolymer as a colloidal dispersion in water or in a fluorocarbon solvent. It is important to extend the polymerization past the Kraft point. The Kraft point is the point where all surfactants are absorbed into the fluoropolymer, thus making larger particles This assures that the stratified fluoropolymer is a highly porous, fibrous mass.

In the process of the present invention, particles of the modified polytetrafluoroethylene comprise the cores made of homopolymer of tetrafluoroethylene. Surrounding the cores of polytetrafluoroethylene is a sheath layer which is a copolymer of tetrafluoroethylene and one or more modifiers. The modifiers which are recommended for use in the present invention have a practical equivalent weight range of from about 500 to about 3000 In the present invention it is desired for the modifier to be from about 10 to about 60 weight percent of the sheath layer, with tetrafluoroethylene representing from about 90 to about 40 weight percent. More preferably, the modifier is from about 15 to about 25 weight percent of the sheath layer with tetrafluoroethylene representing from about 85 to about 75 weight percent of the sheath layer. Most preferably, the modifier is from about 17 to about 20 weight percent of the sheath layer and tetrafluoroethylene is from about 83 to about 80 weight percent of the sheath layer. The core represents from about 10 to about 90 percent of the thickness of the stratified polymer Thus the modifier is from about 5 to about 30 percent of the weight of the stratified polymer. More preferably, the modifier is from about 7 to about 12 percent of the weight of the stratified polymer. Most preferably, the modifier is from about 8 to about 10 percent of the weight of the stratified polymer.

Even though the content of the modifier component is relatively small, the modifier component is included in the sheath layers whereby hydrophilic property is imparted without substantial changes of various physical properties especially heat-resistance, chemical resistance, and fibrilation from those of the homopolymer. Therefore, this can be effectively used for reinforcing a membrane of fluorinated resin having cation exchange groups The modifier used in the present invention is a fluorinated modifier having an acid-type functional group. The acid-type functional groups can be carboxylic acid group, sulfonic acid group or a functional group which is convertible to an acid group. One or two or more kinds of the modifier can be used. In the invention, it is critical to copolymerize the modifier with polytetrafluoroethylene in the sheath layer of the particles of the fluoropolymer. When the concentration of the modifier in the sheath layer is too high, the fibrilation is insufficient and the particles formed do not have the desired fibrous-like structure. When the concentration of the modifier in the sheath layer is too small, the effect of the modification is insufficient and the desired result is not obtained.

The typical modifiers used in the present invention are fluorovinyl modifiers having the formula:

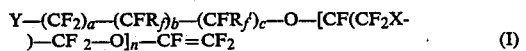

$$Y-(CF_2)_a-(CFR_f)_b-(CFR_f')_c-O-[CF(CF_2X)-CF_2-O]_n-CF=CF_2 \quad (I)$$

where:

Y is selected from the group consisting of —SO$_2$Z, —CN, —COZ, and C(R$_3$f)(R$_4$f)OH;

Z is I, Br, Cl, F, OR, or NR$_1$R$_2$:

R is a branched or linear alkyl radical having from 1 to about 10 carbon atoms or an aryl radical R$_3$f and R$_4$f are independently selected from the group consisting of perfluoroalkyl radicals having from 1 to about 10 carbon atoms:

R$_1$ and R$_2$ are independently selected from the group consisting of H, a branched or linear alkyl radical having from 1 to about 10 carbon atoms or an aryl radical:

a is 0–6:

b is 0–6:

c is 0 or 1;

provided a+b+c is not equal to 0:

X is Cl, Br, F, or mixtures thereof when n>1:

n is 0 to 6; and

R$_f$ and R$_f'$ are independently selected from the group consisting of F, Cl, perfluoroalkyl radicals having from 1 to about 10 carbon atoms and fluorochloroalkyl radicals having from 1 to about 10 carbon atoms.

Particularly preferred is when Y is —SO$_2$F or —COOCH$_3$; n is 0 or 1: R$_f$ and R$_f'$ are F: X is Cl or F; and a+b+c is 2 or 3.

Optionally, along with the modifier (1) shown above and to form a terpolymer with modifier (I) and tetrafluoroethylene, the modifier can also include fluorovinyl compounds having the formula:

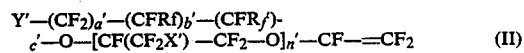

$$Y'-(CF_2)_{a'}-(CFR_f)_{b'}-(CFR_f')_{c'}-O-[CF(CF_2X')-CF_2-O]_{n'}-CF=CF_2 \quad (II)$$

where:

Y' is F, Cl or Br;

a' and b' are independently 0–3;

c is 0 or 1;

provided a'+b'+c' is not equal to 0;

n' is 0–6;

R$_f$ and R$_f'$ are independently selected from the group consisting of Br, Cl, F, perfluoroalkyl radicals having from about 1 to about 10 carbon atoms, and chloroperfluoroalkyl radicals having from 1 to about 10 carbon atoms: and X' is F, Cl, Br, or mixtures thereof when n'>1.

Nonfunctional modifiers, as represented by modifier (II), alter the surface properties of the stratified fluoropolymers of the present invention and enhance the mechanical properties of such stratified fluoropolymers, with respect to the self-supporting aspect of the stratified fluoropolymers. The presence of additional chemical modifiers will alter the surface cohesive energy density of the stratified fluoropolymers, thus resulting in an ability to tailor the nature of the surface contact properties of stratified fluoropolymers for use in catalytic operations. In other words, one can tailor the stratified fluoropolymers of the present invention to catalyze particular reactions, by changing the type and amount of modifiers added to the stratified fluoropolymers.

In the process of the present invention, the modifier is fed into the polymerization system to copolymerize it with tetrafluoroethylene after polymerizing tetrafluoroethylene. Of course, the cores of the modified polytetrafluoroethylene can be formed by homopolymerization of tetrafluoroethylene and then, the modifier and tetrafluoroethylene can be fed into the reaction system in the presence of the homopolymer particles as cores to carry out the copolymerization.

Typical process of the polymerization reaction of the present invention are illustrated as follows.

Into a reactor equipped with a temperature-controlling mechanism, deionized water or a fluorocarbon solvent is charged and a dispersing agent and a polymerization initiator are added and the temperature is controlled and tetrafluoroethylene is compressed to be a specific pressure with stirring to initiate the polymerization. The temperature for polymerization is preferably in a range of from about −50° to about 200° C. Pressure is not critical and is generally used to control the ratios of gaseous modifiers to the other modifiers that are liquid at the chosen conditions The pressure is a matter of convenience to produce the desired modifier contents of the fluoropolymer and to control the polymerization rate of those that are being used. As a general rule, the pressure for polymerization is in a range of from about 1 to about 100 kilograms per square centimeter, preferably from about 3 to about 50 kilograms per square centimeter. The pressure in the polymerization reaction system is maintained by the vapor pressure of tetrafluoroethylene. Depending upon the polymerization reaction, tetrafluoroethylene is consumed to reduce the pressure. The pressure is maintained by compressing tetrafluoroethylene and by continuously feeding tetrafluoroethylene.

Suitable solvents which may optionally be used in the present invention include perfluoroalkanes or perfluorocycloalkanes such as perfluorodimethylcyclohexane or perfluoroheptane.

Using the perfluorinated solvents, the upper temperature limit during polymerization is the point where the ordinary initiators are dissociated too rapidly and the reaction pressure would be too high to incorporate practical amounts of gaseous modifiers. Below the low temperature limits, the initiators do not work and little fluoropolymer could be produced. Alternatively, and preferably, aqueous media may be used for preparing copolymers of the present invention. A pH of about 8 or lower is usually employed and temperatures usually do not exceed about 110° C. Most preferably, an aqueous medium containing a perfluorinated surface active agent such as a carboxylic acid salts with a thermally dissociated peroxide initiator is used. Using the aqueous media, the temperature limit is somewhat lower, but the dissociation of the initiators is still the same consideration. That is, the lower temperature prevents the initiator from working and the upper limit causes the initiator to be consumed too quickly, resulting in low molecular weight fluoropolymers.

In the process of the present invention, conventional organic or inorganic peroxides and persulfates which have radical function can be used as the polymerization initiator source. It is also possible to apply ionized radioactive rays such as X-ray and gamma ray as the polymerization initiator source.

The dispersing agent can be various cationic, anionic and nonionic surfactants. Especially useful as anionic surfactants are water soluble salts of polyfluoroalkyl compounds, for example, alkali metal salts and ammonium salts of perfluoroalkanic acids and omega-hydroperfluoroalkanic acids. The dispersing agent is usually incorporated at a ratio of from about 0 01 to about 10 weight percent, preferably from about 0.05 to about 5 weight percent based on the aqueous medium.

It is possible to incorporate a dispersion stabilizer, a buffering agent, a reaction accelerator, and a pH regulator which are used in the conventional polymerizations in an aqueous medium It is also possible to incorporate an inert organic solvent such as fluorinated saturated hydrocarbons and chlorofluorinated saturated hydrocarbons known as Freon type solvents.

After the polymerization, the unreacted tetrafluoroethylene monomer is purged. The unreacted acid type modifier can be separated by an extraction with a solvent such as trichlorotrifluoroethane.

The condition of the polymerization after the addition of the modifier is selected depending upon the desired content of the modifier component in the particles of the fluoropolymer. The polymerization is usually carried out at a polymerization temperature of from about −50° to about 200° C., under the pressure of from about 1 to about 100 kilograms per square centimeter, preferably from about 3 to about 50 kilograms per square centimeter.

By taking the polymerization to a point past the Kraft point, a coagulated, coalescd highly porous, fibrous fluoropolymer material is produced. It performs better than modifiers which are not coalesced to such a point, for example, the material produced according to the method of U.S. Pat. No. 4,326,046.

The modifier is incorporated at a ratio of from about 0.001 to about 100 weight parts, preferably from about 0.1 to about 30 weight parts per 100 weight parts of the aqueous medium. The modifier can be sequentially or continuously added. The additional materials incorporated in the first stage of the polymerization can be newly added or need not be added to the later stage of the polymerization.

The modified polytetrafluoroethylene of the present invention can be used in various fields, for example, as a reinforcing substance for hydrophilic fluoropolymers; a filtration membrane, a partition membrane, and a hydrophilic binder. This process can be used to form less expensive, strong acid catalyst materials. The materials are also useful as chromatographic packing material, and to impart bonding and processability to essentially inert fluoropolymer aggregates.

EXAMPLE 1

A glass-lined reactor containing 4700 grams of deoxygenated water, 25 grams of $NH_4O_2C_7F_{15}$, 18.9 grams of $Na_2HPO_4.7H_2O$, 15.6 grams of $NaH_2PO_4.H_2O$, and 3.0 grams $(NH_4)_2S_2O_8$, is pressured up to 247 pounds per square inch with tetrafluoroethylene at about 60° C. with stirring at about 500 revolutions per minute. The Reynolds number for the material inside the reactor was about 300,000. The pressure is maintained for about 5 minutes while the tetrafluoroethylene polymerizes to form polytetrafluoroethylene. Thereafter about 216 grams of 2-fluorosulfonylperfluoroethylvinylether is added and the pressure is maintained for about 1 hour. The 2-fluorosulfonylperfluoroethylvinylether reacts with tetrafluoroethylene to form a copolymer sheath on the surface of the previously formed polytetrafluoroethylene particles. The stratified, highly-porous, fibrous stratified fluoropolymer produced is found to have a titrated equivalent weight of about 1675. The reactor conditions are held during the run to produce fluoropolymer of approximately 1100 equivalent weight so the copolymer portion of the fluoropolymer particles should be approximately the outer 2/3 of the particle's volume and can be used where a water-wettable Teflon TM polytetrafluoroethylene material is desired such as membrane filtration or a diaphragm in a chlor-alkali cell.

The fibrous fluoropolymer floc which forms from this run is filtered to obtain a pressed filter cake which is heated to 320° C. for about 15 minutes to obtain a fused cake which is cut into 10–30 mesh (U.S. Standard) size particles. This is hydrolyz converting the fluoropolymer to the sodium salt form by treating it for four hours at about 90° F. in an about 25 weight percent aqueous caustic solution, then treating it for about four hours in about 6 Normal HCl to convert it to the H+ form. The fluoropolymer is then washed in a column with excess deionized water to remove the acid and vacuum dried.

EXAMPLE 2

A glass-lined reactor containing 4700 grams of deoxygenated water, 25 grams of $NH_4O_2C_7F_{15}$, 18.9 grams of $Na_2HPO_4.7H_2O$, 15.6 grams of $NaH_2PO_4.H_2O$, and 3.0 grams $(NH_4)_2S_2O_8$, is pressured up to 247 pounds per square inch with tetrafluoroethylene at about 60° C. with string at about 500 revolutions per minute. The Reynolds Number for in the material inside the reactor was bout 300,000. The pressure is maintained for about 5 minutes while the tetrafluoroethylene polymerizes to form polytetrafluoroethylene. Thereafter about 104 grams of 2-fluorosulfonylperfluoroethylvinylether is added and the pressure is maintained for about 37 minutes. The 2-fluorosulfonylperfluoroethylvinylether reacts with tetrafluoroethylene to form a copolymer sheath on the surface of the previously formed poklytetrafluoroethylene particles. The stratified, highly-porous, fibrous stratified fluoropolymer produced is found to have a titrated equivalent weight of about 3000. The reactor conditions are held during the run to produce fluoropolymer of approximately 1100 equivalent weight so the copolymer portion of the fluoropolymer particles should be approximately the outer ⅓ of the particle's volume and can be used where a water-wettable Teflon ™ polytetrafluoroethylene material is desired such as membrane filtration or a diaphragm in a chlor-alkali cell.

Using a putty knife, the fibrous fluoropolymer floc produced above is pressed into holes drilled into a Teflon ™ polytetrafluoroethylene plate. This plate containing the fluoropolymer fibrous floc is heated to about 340° C. for about 40 minutes, removed, cooled, and the pellets knocked out of the holes. These pellets are hydrolyzed and converted to the catalytic H+ form as previously stated in Example 1.

The stratified fluoropolymer was then examined under a transition electron microscope using standard techniques. The results are shown in the Figure. The magnification is 50,000 times. To aid in determining the size of the stratified polymer a scale is shown for the length of 0.1 micron.

We claim:

1. A process for producing a modified polytetrafluoroethylene which comprises polymerizing tetrafluoroethylene in an aqueous medium containing a dispersing agent with a polymerization initiator source and then, copolymerizing tetrafluoroethylene and one or more fluorinated modifiers having an acid functional group or a functional group which is convertible to the acid group as a copolymerizable modifier in the presence of the resulting polytetrafluoroethylene to a polymerization point past the Kraft point to produce highly porous, fibrous, stratified fluoropolymers having cores made of homopolymer of polytetrafluoroethylene coated with sheath layers which are made of a copolymer of polytetrafluoroethylene and one or more modifiers.

2. The process of claim 1 wherein the modifier has an equivalent weight of from about 500 to about 3000.

3. The process of claim 1 wherein the modifier is from about 10 to about 60 weight percent of the total weight of the sheath layer, with polytetrafluoroethylene representing from about 90 to about 40 weight percent of the sheath layer.

4. The process of claim 1 wherein the modifier is from about 15 to about 25 weight percent of the total weight of the sheath layer, with polytetrafluoroethylene representing from about 85 to about 75 weight percent of the sheath layer.

5. The process of claim 1 wherein the modifier is from about 17 to about 20 weight percent of the total weight of the sheath layer, with polytetrafluoroethylene representing from about 83 to about 80 weight percent of the sheath layer.

6. The process of claim 1 wherein the modifier is from about 5 to about 30 percent of the weight of the stratified polymer.

7. The process of claim 1 wherein the modifier is from about 7 to about 12 percent of the weight of the stratified polymer.

8. The process of claim 1 wherein the modifier is from about 8 to about 10 percent of the weight of the stratified polymer.

9. The process according to claim 1 wherein said copolymerizable modifier is a fluorovinyl modifier having the formula:

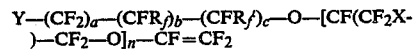

(I)

where:

Y is selected from the group consisting of —SO$_2$Z, —CN, —COZ, and C(R$_3$f)(R$_4$f)OH;

Z is I, Br, Cl, F, OR, or NR$_1$R$_2$;

R is a branched or linear alkyl radical having from 1 to about 10 carbon atoms or an aryl radical:

R$_3$f and R$_4$f are independently selected from the group consisting of perfluoroalkyl radicals having from 1 to about 10 carbon atoms;

R$_1$ and R$_2$ are independently selected from the group consisting of H, a branched or linear alkyl radical having from 1 to about 10 carbon atoms or an aryl radical:

a is 0–6:

b is 0–6:

c is 0 or 1;

provided a+b+c is not equal to 0;

X is Cl, Br, F, or mixtures thereof when n>1;

n is 0 to 6: and

R$_f$ and R$_f'$ are independently selected from the group consisting of F, Cl, perfluoroalkyl radicals having from 1 to about 10 carbon atoms and fluorochloroalkyl radicals having from 1 to about 10 carbon atoms.

10. The process according to claim 9 wherein the modifier includes, along with the modifier (I) a modifier having the formula:

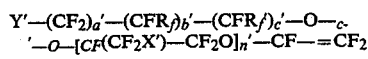

(II)

where:

Y' is F, Cl or Br;

a' and b' are independently 0–3:

c is 0 or 1;

provided a'+b'+c' is not equal to 0;

n' is 0–6:

R$_f$ and R$_f'$ are independently selected from the group consisting of Br, Cl, F, perfluoroalkyl radicals having from about 1 to about 10 carbon atoms, and chloroperfluoroalkyl radicals having from 1 to about 10 carbon atoms; and X' is F, Cl, Br, or mixtures thereof when n'>1.

11. The process of claim 10 wherein Y is —SO$_2$F or —COOCH$_3$: n is 0 or 1;R$_f$ and R$_f'$ are F: X is Cl or F: and a+b+c is 2 or 3.

12. The process of claim 1 wherein the polymerization in conducted under a pressure of from about 1 to about 100 kilograms per square centimeter.

13. The process of claim 1 wherein the polymerization in conducted under a pressure of from about 3 to about 50 kilograms per square centimeter.

14. The process of claim 12 wherein the pressure is maintained by the vapor pressure of tetrafluoroethylene.

15. The process of claim 13 wherein the pressure is maintained by the vapor pressure of tetrafluoroethylene.

16. The process of claim 1 wherein the dispersing agent a cationic, anionic or nonionic surfactant.

17. The process of claim 1 wherein the dispersing agent is an anionic surfactant.

18. The process of claim 1 wherein the dispersing agent is a water soluble salt of a polyfluoroalkyl compound.

19. The process of claim 1 wherein the dispersing agent is incorporated at a ratio of from about 0.01 to about 10 weight percent of the aqueous medium.

20. The process of claim 1 wherein the dispersing agent is incorporated at a ratio of from about 0.05 to about 5 weight percent on the aqueous medium.

21. The process of claim 1 wherein the polymerization is conducted at a temperature of from about −50° to about 200° C.

* * * * *

UNITED STATES PATENT AND TRADEMARK OFFICE
CERTIFICATE OF CORRECTION

PATENT NO.   :  4,859,745

DATED        :  August 22, 1989

INVENTOR(S)  :  Carl, et al.

It is certified that error appears in the above-identified patent and that said Letters Patent is hereby corrected as shown below:

First Page, under "U.S. PATENT DOCUMENTS", the 24th listing; change "4,025,055" to --4,025,405--.

Second Page, under "U.S. PATENT DOCUMENTS", the 17th listing; change "4,282,738" to --4,284,738--.

Second Page, under "OTHER PUBLICATIONS"; add the following:
--FLUORINE IN ORGANIC CHEMISTRY, R. D. Chambers, pp. 211-212

CHEMISTRY OF ORGANIC FLOURINE COMPOUNDS, M. Hudlicky, pp. 20-21

" 'Nafion', An Electrochemical Traffic Controller", D.J. Vaughan, pp. 10-13

ALIPHATIC FLUORINE COMPOUNDS, A. M. Lovelace, D. A. Rausch and W. Postelnek, p. 107

Column 2, line 53; insert a period --.-- between "particles" and "This".

Column 2, line 63; insert a period --.-- between "3000" and "In".

Column 4, line 4; change "(1)" between "modifier" and "shown" to --(I)--.

Column 4, line 60; insert a period --.-- between "conditions" and "The".

UNITED STATES PATENT AND TRADEMARK OFFICE
CERTIFICATE OF CORRECTION

PATENT NO.  :  4,859,745
DATED       :  August 22, 1989
INVENTOR(S) :  Carl, et al.

It is certified that error appears in the above-identified patent and that said Letters Patent is hereby corrected as shown below:

Column 5, line 37; change "as" between "useful" and "anionic" to --are--.

Column 5, line 38; change "are" between "surfactants" and "water" to --as--.

Column 5, line 42; change "0 01" to --0.01--.

Column 5, line 48; insert a period --.-- between "medium" and "It".

Column 6, line 52; change "hydrolyz" to --hydrolyze--.

Column 6, line 67; change "string" to --stirring--.

Column 7, line 8; change "poklytet-" to --polytet- --.

Column 8, line 45; replace:

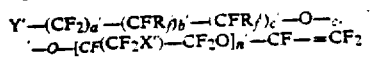

with:

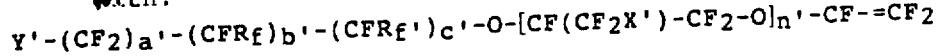

Signed and Sealed this

Twenty-ninth Day of January, 1991

Attest:

HARRY F. MANBECK, JR.

Attesting Officer        Commissioner of Patents and Trademarks